LLOYD E. HERDLE
ALEXANDER WALKER, JR.
FRANK L. WELLS
INVENTORS

BY
ATTORNEYS

LLOYD E. HERDLE
ALEXANDER WALKER, JR.
FRANK L. WELLS
INVENTORS

ATTORNEYS

United States Patent Office 3,523,060
Patented Aug. 4, 1970

3,523,060
WOOD PULPING-DELIGNIFICATION IN THE PRESENCE OF HIGH SULFUR DIOXIDE CONCENTRATIONS
Lloyd E. Herdle, Alexander Walker, Jr., and Frank L. Wells, Rochester, N.Y., assignors to Eastman Kodak Company, Rochester, N.Y., a corporation of New Jersey
Filed Oct. 16, 1967, Ser. No. 675,607
Int. Cl. D21c 3/20
U.S. Cl. 162—76
17 Claims

ABSTRACT OF THE DISCLOSURE

This invention relates to acid sulfite processes for delignifying and pulping wood. More particularly, the present invention is directed to processes involving the delignification and pulping of wood in the presence of sulfur dioxide concentrations of from 30 to about 80 weight percent of sulfur dioxide and at temperatures within the range of from about 120° C. to about 145° C.

BACKGROUND

Conventional acid sulfite pulping processes, in which wood is converted into a form in which it can be used directly for the manufacture of paper, cellulose esters, and the like, involve initially a fairly long (3–4 hours, at least) "delignification" step wherein the wood is treated with a few percent (6–8%, based on the weight of the aqueous portion) of $SO_2$ dissolved in water. A small amount of material containing alkali metal or alkaline earth metal cations is always used in contemporary commercial sulfite pulping processes along with the $SO_2$. During this "delignification" step the temperature of the "cook" is usually gradually increased (over a period of at least 3–4 hours), from below about 100° C. to about 120° C. (the minimum temperature necessary to obtain the desired degree of "pulping" in such systems). "Pulping" temperatures in conventional sulfite pulping processes are generally within the range of from about 120° C. to about 145° C.

During the time the temperature of the "cook" is being gradually raised, most of the lignin in the wood is gradually reacting with the dissolved sulfite to yield a lignosulfonate type material that is soluble in the liquor. Thus, the greatest portion of the lignin that was originally in the wood is removed in the form of lignosulfonates dissolved in the sulfite liquor that is ultimately drained away from the pulp product. Removal of almost all of the lignin in this manner is essential for the manufacture of useful, bleachable sulfite pulp.

Such conventional "delignification" processes have been worked out through many years of experience. Although it is desireable to use a very fast, higher temperature delignification step (rather than such a prolonged procedure), it was heretofore necessary to use such a gradual increase in reaction temperature to make a soluble lignosulfonate. Otherwise (by raising the temperature of such conventional sulfite "cooks" swiftly to the pulping range; i.e. substantially less than 3 hours), a discolored, so-called "burned pulp" resulted. Such a "burned pulp" could not be bleached readily, and was believed caused by resinification of the lignin, resulting in insoluble lignin derivatives that could not be removed from the wood. This necessity to delignify wood chips initially at temperatures below about 110° C. (before raising the "cook" temperature to the pulping range of 120° C. or more), particularly in the absence of large amounts of "combined" $SO_2$ in the "cook," is described in detail at pages 158–162 of volume 1 of "Pulp and Paper," edited by James P. Casey (Interscience Publishers, 1960), and on pages 267 and 272 of TAPPI, volume 37, No. 6 (June 1954), in an article by G. A. Richter and L. H. Pancoast, Jr. entitled "Sulphonation of Wood Lignin."

Methods of improving the quality of sulfite pulps and/or substantially decreasing the amount of processing time required to make a final, bleachable pulp are being continuously sought by those in the wood pulping art as significant means for reducing the cost of manufacturing such useful materials. In addition, methods for manufacturing sulfite pulp having sufficiently high quality to be useful directly (after being bleached, but without the need for any additional refinement) as a raw material for the manufacture of high quality esterified cellulose such as cellulose acetate, cellulose propionate, cellulose phthalate and the like suitable for use as photographic film base, for example, have been actively sought for many years.

THE PRESENT INVENTION

It has now been discovered that both improved quality and substantially reduced processing times can be obtained in sulfite pulping processes (a) by utilizing very large quantities of sulfur dioxide, at least during the delignification step of the processes, and (b) by "forcing" the delignification step at high temperatures that were heretofore believed to be impracticable, because of the above-described "burning" problem. Evidently, for some surprising reason that is presently not known, the use of the very high levels of $SO_2$ (i.e., at least about 30%) overcomes the "burning" problem. One of the very valuable results of practicing the present invention can be illustrated by the fact that, whereas heretofore, it was believed necessary to consume at least about 7–8 hours to manufacture acceptable, bleachable sulfite pulps (having Kappa Numbers below about 30), the present invention makes it possible to manufacture similarly acceptable pulps in substantially less than half that time.

Figure 3:
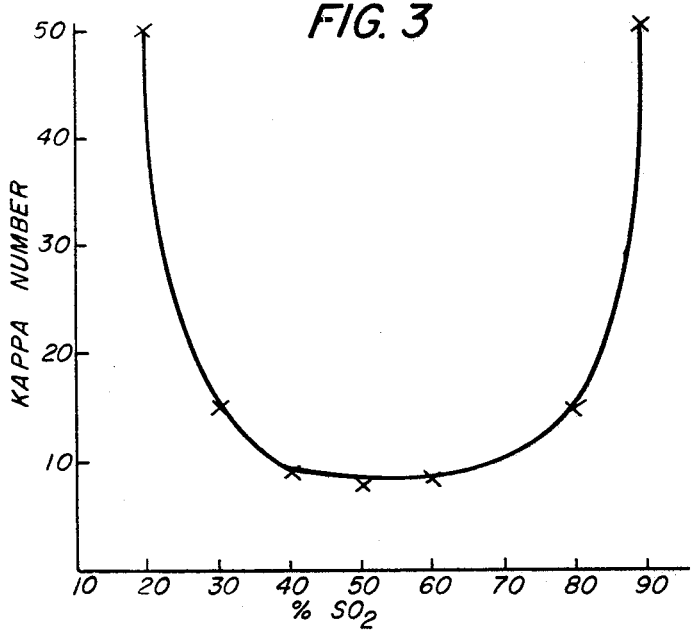
FIG. 3 is a graph of the effect of various amounts of $SO_2$ on the Kappa Number of pulp in the present invention.
Figure 4:
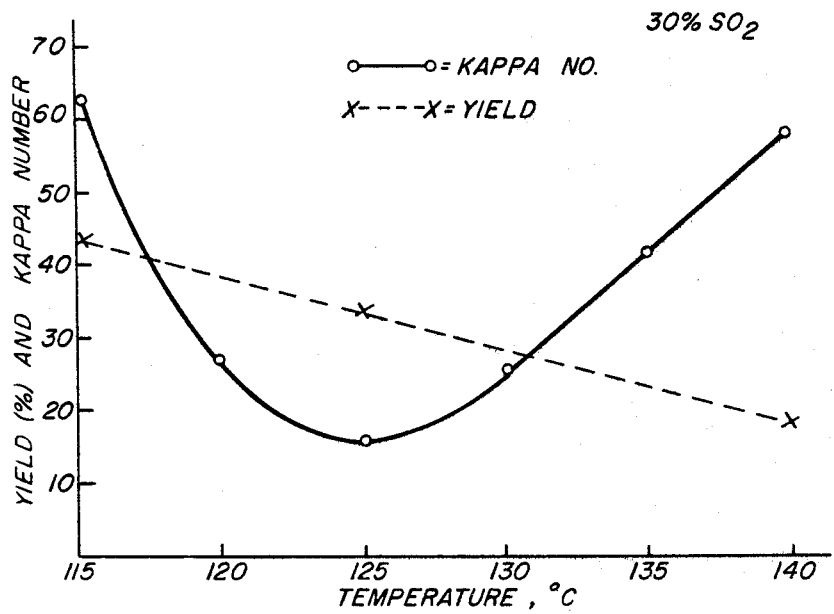
FIG. 4 is a graph of percent yield and Kappa Number versus temperature in the process of the present invention of delignifying pulp with 30% total $SO_2$ content.

The most important elements that contribute to the success of the present invention are (1) the use of at least about 30% of $SO_2$ and (2) the quick attainment of pulping temperatures. Whereas pulps having acceptable Kappa Numbers (i.e., below about 40) were not obtainable via conventional procedures within total processing times of less than about 6–10 hours, it is possible in the practice of this invention to attain this goal in 2½ hours, or even less time. In the present processes, generally from about 30 to about 80 weight percent of $SO_2$ (based on the combined weight of the water and the $SO_2$ in the cook) should be present in the delignification reaction mass (containing the particulated wood, water, $SO_2$, and any other desired adjuvants), when the temperature of the "cook" is raised above about 110° C. Note that in this context the reaction mass is not termed a "cook" unless some $SO_2$ is present therein. However, the use of from about 30% to about 50% of $SO_2$ is preferred because of the necessity for stronger autoclaves when relatively higher levels of $SO_2$ are used. The effect of various amounts of $SO_2$ on the Kappa Number of spruce pulp that was prepared by a procedure such as that described in Example 1, below is illustrated in FIG. 3 of the drawings.

Figure 1:
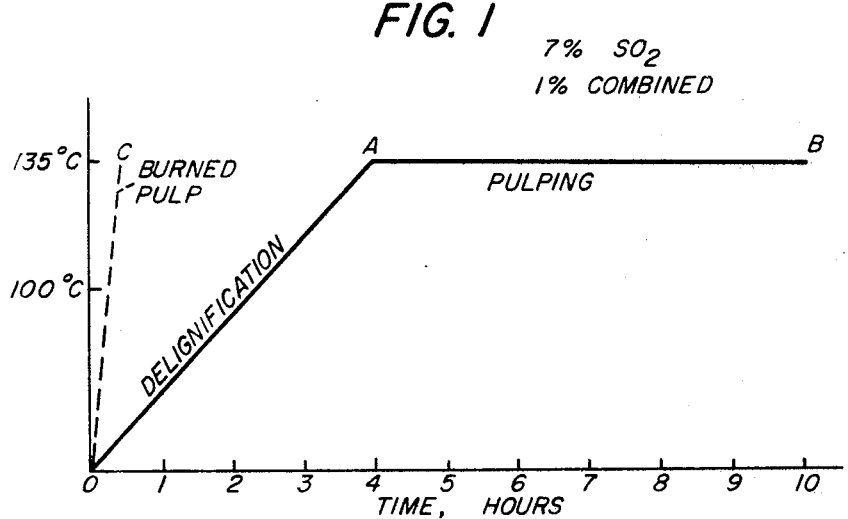
FIG. 1 is a graph of temperature versus time in a conventional process of delignifying pulp with 8% total $SO_2$ content.
Figure 2:
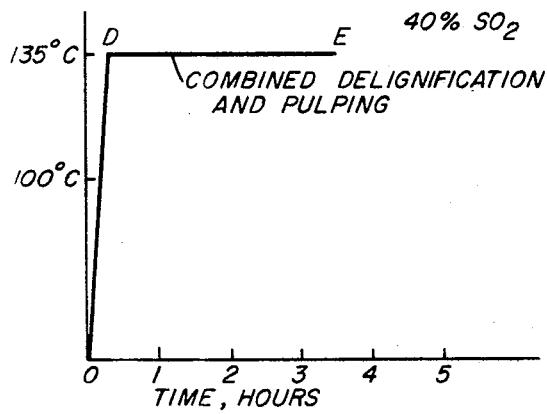
FIG. 2 is a graph of temperature versus time in the process of the present invention of delignifying pulp with 40% total $SO_2$ content.
Figure 5:
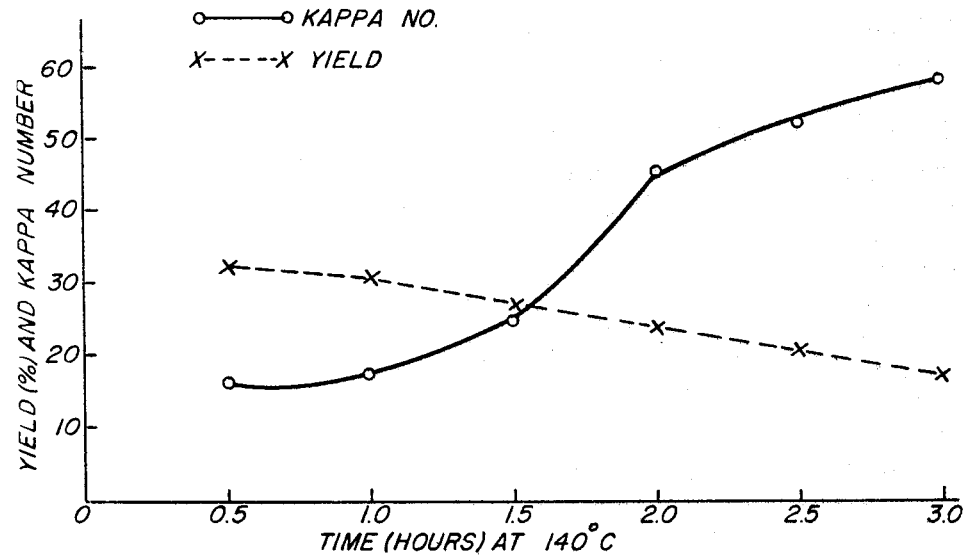
FIG. 5 is a graph of percent yield and Kappa Number versus time at a constant temperature in the present invention.

As it was pointed out above, it is also essential in the practice of this invention, to push the temperature of the "cook" into the "pulping" range, i.e., from about 120° C. to about 145° C. quickly, i.e., in at most about 2 hours, and preferably in less than about 30 minutes of the time the necessary high level of $SO_2$ is attained in the "cook." This is in direct contrast to what has heretofore been possible, because initially, at least several hours' reaction time below pulping temperatures were necessary to avoid insolubilization of the lignin. A typical prior art process is graphically compared with one of the present processes in FIGS. 1 and 2. The valuable time-saving advantage that can result from practicing the present invention can readily be appreciated from a comparison of FIGS. 1 and 2. Note that, in the conventional processes of FIG. 1, if the temperature of the cook is pushed into the pulping range before all of the lignin has been solubilized (i.e., in less than 3–4 hours), the pulp is burned, thereby practically destroying its usefulness. By comparison, in the process illustrated by FIG. 2, with 40% $SO_2$ present in the cook, forcing the temperature of the cook to 135° C. in less than 15 minutes surprisingly resulted in no "burning" whatever. As a matter of fact, reaching pulping temperatures over prolonged periods of time (as in conventional processes) are actually somewhat detrimental to the pulps when the very high $SO_2$ levels of this invention are used. In addition, prolonged exposure (i.e. longer than about 5 hours) at pulping temperatures is also detrimental to the Kappa Numbers of pulp manufactured via the present processes. Since relatively higher pulping temperatures make it necessary to terminate the pulping process even sooner than this (for example, for best results, pulping at 140° C. should be terminated after at most about 2 hours as illustrated by FIG. 5), it can be seen that the actual preferred "pulping" times of the present processes will vary somewhat, depending upon the actual temperature profile utilized; generally higher temperatures require relatively shorter reaction times.

The particular manipulative procedures and the particular equipment that are utilized in the practice of this invention are not critical insofar as the successful practice thereof is concerned. All that is necessary is that, at least during the initial 15 minutes of time in which the cooks of the present invention are exposed to pulping temperatures, enough pressure is maintained on the reaction mass to keep the level of $SO_2$ above the minimum useful level. Thus, in perhaps the simplest embodiment of the present processes, while liquid $SO_2$, water, and wood chips can simply be blended at about room temperature in an autoclave and the resulting cook is then heated quickly to pulping temperatures and held at this point for the time necessary to produce the desired bleachable pulp, still another embodiment involves the charging of the autoclave with wood chips followed by the introduction of hot (already at pulping temperatures) acidic aqueous concentrated $SO_2$ solution. This latter technique represents a method for obtaining the shortest reaction times, and also represents a preferred embodiment of the present processes. Still another technique for accomplishing the present processes involves the initial charging of very concentrated $SO_2$ solution onto the wood cellulose followed by a relatively short exposure (i.e., at most about one hour) of the resulting concentrated $SO_2$ cook to pulping temperatures after the required initial quick attainment of a pulping temperature. Then, before the completion of pulping, the level of $SO_2$ can be reduced to as low as 5–6%, if desired. By this latter procedure, the actual time the pulping step is terminated becomes less important.

In the following examples, all parts are by weight unless otherwise specified.

Example 1

Into a conventional glass lined autoclave able to withstand internal pressures of at least 600 pounds per square inch are charged 50,000 parts of Eastern spruce chips and 420,000 parts of water, followed by 180,000 parts of liquid $SO_2$. The liquid $SO_2$ is suspended in a plastic container over the aqueous suspension of chips until the autoclave is sealed. Then the plastic container is breached and the $SO_2$ permitted to blend with the wood chips and the water. Superheated steam is immediately applied to the jacket of the autoclave, the cook thereby being heated to 135° C. in about 15 minutes. Thereafter, over the next 2 hours, the temperature of the cook is maintained within about 1 degree of 135° C. At the end of this time, the $SO_2$ is vented from the autoclave, and the resulting cook is filtered. The pulp is then washed several times with water, dried, and analyzed. Data from the analysis appears in Table 1, below.

TABLE 1

| | |
|---|---|
| Yield (percent) | 32 |
| Kappa No. | 20 |
| Screenings (percent) | 10 |
| Lignin (percent) | 5 |
| Pentosans | 0.3 |

Other woods can be treated in this same manner with correspondingly excellent results.

Another surprising benefit that can be obtained from practicing this invention can be appreciated from an understanding of the foregoing example. Thus, it is especially noteworthy that the present prcoesses can be practiced in the absence of so-called "combined" $SO_2$; that is, $SO_2$ that has been chemically combined with an alkali metal or alkaline earth metal base such as NaOH, $MgCO_3$, $Ca(OH)_2$, and the like. Since no "combined" $SO_2$ is needed in the practice of the present processes, one of the difficult waste disposal problems that presently vex sulfite pulp manufacturers can simply be avoided. It can be appreciated that this is a very significant contribution to the art, since waste disposal is one of the greatest problems facing contemporary pulp manufacturers. It should be noted, however, that the present processes can nevertheless also be successfully practiced in the presence of "combined" $SO_2$ if manufacturers prefer to use "combined. "Combined" $SO_2$ (for example, in the form of bisulfite) results when a basic material is added to an acidic sulfite cook. For example, the addition of calcium hydroxide to the cook results in the formation of calcium bisulfite in the presence of excess $SO_2$.

Still another advantage of the present processes is that they are useful in combination with certain improved processes such as that described in U.S. Pat. 2,060,068. Note that in this patent the use of lower aliphatic alcohols such as isopropanol, ethanol, methanol, butanol and pentanol (that are miscible with acidic sulfite cooks), in conjunction with the usual materials in sulufite pulping cooks are described. Lower aliphatic carboxylic acids (such as acetic, formic, propionic, butanoic and pentanoic acids) and ethylene glycol and propylene glycol can also be used in the present processes. Thus, while the above-described very valuable benefits can be obtained by practicing the present processes in the absence of either lower aliphatic alcohols, ethylene glycol, butylene glycol, and/or lower aliphatic acids, still more valuable, significantly improved results can be obtained by utilizing one or more of these organic adjuvants in the present processes. Accordingly, the use of lower aliphatic alcohols miscible aliphatic glycols, and/or lower aliphatic acids in the present generic processes constitute preferred embodiments of this invention.

While small amounts of such miscible organic adjuvants will result in at least some improvements, generally, when lower aliphatic alcohols are utilized in these processes, amounts within the range of from about 5 to about 50, and preferably from about 5 to about 30, weight percent (based on the combined weights of the liquids in the cook) should be utilized. Similarly, when lower fatty acids are used in these processes, generally noticeably improved results can be obtained when from about 5 to about 50, and preferably from about 10 to about 30 weight percent (based on the combined weights of the liquids in the cook) should be utilized. The miscible glycols should be treated as the lower aliphatic alcohols, insofar as the quantities in which they are useful is concerned. When two or more of the group consisting of these alcohols, glycols, and fatty acids are used in the same cook, somewhat lower amounts of each yield excellent results. The following examples illustrate some of the additional benefits that can be obtained by using this particular preferred embodiment.

Examples 2-8

These examples are carried out in the same manner as that described in Example 1, above, except that, where lower fatty acid, glycol, or alcohol are utilized, the initial amounts of water used is reduced accordingly. Data for Example 1 is repeated in Table 2 for convenience.

processes. In this example, the processes of Examples 9-17 are followed, using Douglas-fir chips, and a "pulping" temperature of 135° C. In Table 4, below, the "total processing time" includes a 15-minute heatup to 135° C. and subsequent pulping at 135° C. The liquid charge contains 30% $SO_2$, 55% water, and 15% isopropyl alcohol.

TABLE 4

| | | | | | |
|---|---|---|---|---|---|
| Total Processing Time, hours | 1.25 | 1.75 | 2.25 | 2.75 | 3.25 |
| Pressure, p.s.i | 380 | 385 | 400 | 395 | 410 |
| Yield, percent | 36.7 | 31.5 | 33.4 | 25.6 | 28.0 |
| Screenings, percent | 13.3 | 4.5 | 3.6 | 3.1 | 2.8 |
| Kappa No | 24.0 | 19.2 | 18.6 | 30.5 | 37.4 |
| Lignin, percent | 5.8 | | | | |
| Pentosans, percent | 1.8 | 1.5 | 0.9 | 0.6 | 0.6 |

Example 20

Into a conventional autoclave such as that described in Example 1 are charged 50,000 parts of eastern spruce wood chips. Superheated steam is then applied to the outer walls of the autoclave to maintain their temperature at 135° C. Into this autoclave are then pumped, under pressure, a hot (135° C.) blend of 216,000 parts of liquid $SO_2$, 60,000 parts of isopropanol, and 334,000 parts of water. The resulting cook is simultaneously delignified and pulped at 1355° C. for 1.5 hours. Results of analyses on the resulting bleachable pulp are tabulated in Table 5, below.

TABLE 2

| | Ex. 1[1] | Ex. 2[1] | Ex. 3[1] | Ex. 4[2] | Ex. 5[2] | Ex. 6[3] | Ex. 7[3] | Ex. 8[1] |
|---|---|---|---|---|---|---|---|---|
| Liquid charged: | | | | | | | | |
| $SO_2$, percent | 30 | 30 | 30 | 30 | 30 | 30 | 30 | 30 |
| $H_2O$, percent | 70 | 55 | 55 | 55 | 55 | 55 | 55 | 45 |
| $CH_3COOH$, percent | | 15 | | 15 | | 15 | | 15 |
| $(CH_3)_2CHOH$, percent | | | 15 | | 15 | | 15 | 10 |
| Pressure, p.s.i | 505 | 390 | 395 | 400 | 400 | 400 | 428 | 410 |
| Analyses: | | | | | | | | |
| Yield, percent | 32 | 25 | 36 | 37 | 31 | 25 | 31 | 29 |
| Screenings, percent | 11 | 4.5 | 1.1 | 23.2 | 7.1 | 21.2 | 8.9 | 1.5 |
| Kappa No | 20 | 11 | 6 | 22 | 10 | 30 | 26 | 15 |
| Lignin, percent | 5 | 2 | 3 | 6 | 4 | | | 4 |
| Pentosans, percent | 0.3 | 1.2 | 1 | 1 | 1 | 0.6 | 0.6 | 0.5 |

[1] Eastern Spruce.
[2] Southern pine.
[3] Douglas-fir.

Examples 9-18

In the following examples, data for which are summarized in Table 3, manipulative procedures are practically identical to those in Examples 1-8, except that the pulping temperature is 140° C. in Examples 9-18 and the total time during which the cook is held at pulping temperature is only one-half hour. Thus, in Examples 9-18, the total processing time, including both delignification and pulping of the wood chips is only one hour.

TABLE 5

| | |
|---|---|
| $SO_2$ (percent) | 36 |
| $H_2O$ (percent) | 59 |
| Isopropanol (percent) | 5 |
| Pressure during cook, p.s.i. | 445 |
| Yield (percent) | 32.1 |
| Screenings (percent) | 10.0 |
| Kappa No. | 6.3 |
| Pentosans (percent) | 1.3 |

TABLE 3

| | Ex. 9[1] | Ex. 10[1] | Ex. 11[1] | Ex. 12[2] | Ex. 13[2] | Ex. 14[2] | Ex. 15[3] | Ex. 16[3] | Ex. 17[3] | Ex. 18[4] |
|---|---|---|---|---|---|---|---|---|---|---|
| Liquid charged: | | | | | | | | | | |
| $SO_2$, percent | 30 | 30 | 30 | 30 | 30 | 30 | 30 | 30 | 30 | 30 |
| $H_2O$, percent | 70 | 55 | 55 | 70 | 55 | 55 | 70 | 55 | 55 | 55 |
| $CH_3COOH$, percent | | 15 | | | 15 | | | 15 | | |
| $(CH_3)_2CHOH$, percent | | | 15 | | | 15 | | | 15 | |
| Ethylene glycol, percent | | | | | | | | | | 15 |
| Pressure, p.s.i | 490 | 400 | 385 | 485 | 385 | 385 | 490 | 395 | 400 | 455 |
| Analyses: | | | | | | | | | | |
| Yield, percent | 30.0 | 35.2 | 32.5 | 40.3 | 32.6 | 43.6 | 31.5 | 34.7 | 33.3 | 32.2 |
| Screenings, percent | 3.1 | 0.5 | 0.1 | 1.5 | 0.5 | 0.9 | 30.6 | 15.6 | 10.8 | 1.2 |
| Kappa No | 14.4 | 5.3 | 6.0 | 14.5 | 7.7 | 9.1 | 19.2 | 15.8 | 14.8 | 8.0 |
| Lignin, percent | 3.4 | 1.2 | 1.2 | 2.6 | 1.2 | 1.5 | 3.7 | 3.0 | 2.8 | |
| Pentosans, percent | 0.8 | 1.7 | 2.2 | 4.9 | 1.2 | 6.3 | 2.9 | 4.1 | 4.3 | 0.7 |

[1] Gumwood.
[2] White Birch.
[3] Alder.
[4] Eastern Spruce.

Example 19

An additional advantage of practicing the processes of the present invention is that Douglas-fir can be converted to an acceptable, bleachable sulfite pulp thereby. This is not possible via conventional acidic sulfite pulping

Examples 21-25

Cooks were conducted as in Example 20, except that the hot liquid blend is adjusted to contain varying amounts of isopropanol. Analyses of the pulps resulting from these cooks are summarized in Table 6.

TABLE 6

|  | Ex. 21 | Ex. 22 | Ex. 23 | Ex. 24 | Ex. 25 |
|---|---|---|---|---|---|
| $SO_2$, percent | 36 | 36 | 36 | 36 | 36 |
| $H_2O$, percent | 54 | 49 | 44 | 34 | 24 |
| Alcohol, percent | 10 | 15 | 20 | 30 | 40 |
| Yield, percent | 35.5 | 37.1 | 36.4 | 38.9 | 35.5 |
| Screenings, percent | 9.0 | 1.0 | 2.7 | 2.6 | 4.4 |
| Kappa No. | 6.1 | 6.3 | 5.3 | 6.1 | 16.9 |
| Pentosans, percent | 1.6 | 0.7 | 2.0 | 1.9 | 1.9 |
| Pressure, p.s.i. | 400 | 435 | 355 | 335 | 280 |

Examples 26–30

The following examples illustrate still another very valuable benefit that can be obtained by practicing the present invention. Thus, via the present processes, bleachable sulfite pulps can be obtained that are useful directly as raw materials for high quality cellulose esterification processes (without the necessity for any additional "refinement" treatments such as those that must be used on conventional sulfite pulps in order to adapt them for such esterification processes).

Table 7, below, summarizes data resulting from treating several samples of wood chips in the following manner:

(1) *Delignification and pulping.*—The processes of Example 1, above, are followed, varying only the amount of water (when the lower aliphatic carboxylic acid or the lower aliphatic alcohol is used) to keep constant the total amount of liquid in the autoclave. "Total processing time" includes both the warmup and the "pulping" steps.

(2) *Bleaching.*—The unbleached pulps are bleached in a conventional manner by sequentially washing them with first an alkaline aqueous solution of chlorine dioxide and then a dilute aqueous solution of HCl.

(3) *Esterification.*—A conventional esterification process is followed, whereby the bleached pulp is treated as described in an article by L. E. Herdle, L. H. Pancoast, Jr., and R. H. MacClaren in "TAPPI," vol. 47, pages 617–620 (October 1964). A description of the "clarity" and "color" tests is also contained in this Herdle et al. publication. Samples yielding acetate solution "color" values below about 300 and "clarity" values of 10 or more are considered acceptable "acetylation grade" pulps.

TABLE 7

|  | Ex. 26 [1] | Ex. 27 [1] | Ex. 28 [1] | Ex. 29 [2] | Ex. 30 [2] |
|---|---|---|---|---|---|
| Pulping data: |  |  |  |  |  |
| $SO_2$, percent | 30 | 30 | 30 | 30 | 30 |
| $H_2O$, percent | 60 | 60 | 70 | 55 | 55 |
| $CH_3COOH$, percent | 10 |  |  | 15 |  |
| $(CH_3)_2CHOH$, percent |  | 10 |  |  | 15 |
| Total process time, hrs. | 2.0 | 2.0 | 2.5 | 2.5 | 2.5 |
| Yield, percent | 34.0 | 35.9 | 33.0 | 26.2 | 24.9 |
| Pressure, p.s.i. | 405 | 435 | 495 | 415 | 425 |
| Acetate solution data: |  |  |  |  |  |
| Clarity | 10 | 11 | 14 | 16 | 15 |
| Color | 185 | 275 | 110 | 125 | 185 |

[1] Eastern spruce.
[2] Gumwood.

The "acetate solution data" for a bleached sulfite pulp that has not been further "refined," by comparison reveals that such materials are completely unacceptable for use in the manufacture of low haze, high clarity, colorless cellulose acetate film bases. Heretofore, when it was desired to use sulfite pulps as raw materials for making such high quality cellulose esters, they had to first be subjected to a costly "refinement" step involving the additional treatment of the pulp with dilute aqueous NaOH solution. Such additional "refinement" often caused losses of yield amounting to as much as 30%. The present invention makes it possible to manufacture so-called "acetylation grade" pulps via the sulfite process without the necessity for such costly "refinement" step.

Another specific embodiment of the present processes involves the maintenance of at least about 30 weight percent of $SO_2$ in the cook during only the first portion of the present "pulping" step. Thus, after at least about 5 minutes of exposure to pulping temperatures, (preferably after at least about 15 minutes within this temperature range) some of the $SO_2$ can be vented from the reactor if desired. Apparently the most critical stage of the present processes is the initial step involving the quick heating of the wood in presence of at least about 30% solutions of $SO_2$.

The invention has been described in detail with particular reference to preferred embodiments thereof, but it will be understood that variations and modifications can be effected within the spirit and scope of the invention as described hereinabove and as defined in the appended claims.

We claim:
1. In a process for manufacturing bleachable wood pulp from particulated wood, which process comprises the steps of first delignifying said wood by converting most of the lignin in said wood to soluble lignosulfonates by reacting said lignin with sulfur dioxide in an acidic aqueous slurry of said wood at temperatures below about 120° C., and subsequently completing the pulping of the resulting treated wood at a temperature between about 120° C. and about 145° C.; the improvement which comprises

(a) delignifying said wood by (1) forming an acidic aqueous suspension by intermixing said wood with water and at least 30 weight percent of sulfur dioxide, based on the combined weight of said water and said sulfur dioxide, and (2) raising the temperature of said acidic aqueous suspension quickly as compared with prior art processes, within a period of at most 2 hours, to at least 120° C., and (b) thereafter, until said wood is pulped, maintaining the temperature of said acidic aqueous suspension between about 120° C. and about 145° C. and simultaneously maintaining a concentration of at least 30 weight percent of sulfur dioxide in said acidic aqueous suspension with the aid of sufficient pressure for at least 15 minutes after the temperature of said acidic aqueous suspension has reached 120° C.

2. An improved process as in claim 1, wherein said concentration of said sulfur dioxide in said acidic aqueous suspension is between 30 and about 80 weight percent, based on the total weight of liquids in said acidic aqueous suspension.

3. An improved process as in claim 2, wherein said temperature is raised quickly until it is within the range of from about 125° C. to about 145° C.

4. An improved process as in claim 2, wherein said acidic aqueous suspension also contains at least 5 weight percent of a miscible organic adjuvant selected from the group consisting of lower aliphatic alcohols, lower aliphatic carboxylic acids, ethylene glycol, and butylene glycol.

5. An improved process as in claim 4, wherein said miscible organic adjuvant is a lower aliphatic alcohol; the amount of said alcohol in said acidic aqueous suspension being from about 5 to about 30 weight percent, based upon the total weight of liquids in said acidic aqueous suspension.

6. An improved process as in claim 4, wherein said miscible organic adjuvant is a lower aliphatic carboxylic acid, the amount of said carboxylic acid being from about 10 to about 30 weight percent, based upon the total weight of liquids in said acidic aqueous suspension.

7. An improved process as in claim 4, wherein said miscible organic adjuvant is a glycol selected from the group consisting of ethylene glycol and propylene glycol.

8. An improved process as in claim 5, wherein said alcohol is isopropyl alcohol.

9. An improved process as in claim 5, wherein said alcohol is ethyl alcohol.

10. An improved process as in claim 5, wherein said alcohol is amyl alcohol.

11. An improved process as in claim 6, wherein said carboxylic acid is acetic acid.

12. An improved process as in claim 6, wherein said carboxylic acid is butyric acid.

13. An improved process as in claim 6, wherein said carboxylic acid is propionic acid.

14. A process which comprises (1) blending wood chips with a hot mixture which consists essentially of water and from 30 to about 80 weight percent of sulfur dioxide, the temperature of said hot mixture being within the range of from about 120° C. to about 145° C. during said blending; and (2) maintaining the temperature of the resulting blend within said range for at least 30 minutes until said wood chips are pulped; a concentration of at least 30 weight percent of said sulfur dioxide being maintained in said resulting blend with the aid of sufficient pressure for at least 15 minutes.

15. A process as in claim 14, wherein said hot mixture contains, in addition to said water and said sulfur dioxide, from about 5 to about 30 weight percent, based on the total weight of liquids in said hot mixture, of a lower aliphatic alcohol.

16. A process as in claim 5, wherein said lower aliphatic alcohol is replaced with a glycol selected from the group consisting of ethylene glycol and propylene glycol.

17. A process as in claim 14, wherein said hot mixture contains, in addition to said water and said sulfur dioxide, from about 10 to about 30 weight percent, based on the total weight of liquids in said hot mixture, of a lower aliphatic acid.

References Cited

UNITED STATES PATENTS 2,060,068 11/1936 Groombridge et al. ____ 162—77
3,210,237 10/1965 Madison _____ 162—84 X

OTHER REFERENCES

Moore et al., "A Survey of Pulping Variables in the Sulphite Process," p. 113.

ARTHUR D. KELLOGG, Primary Examiner

A. L. CORBIN, Assistant Examiner

U.S. Cl. X.R.

162—77, 83, 84

PO-1050
(5/69)

UNITED STATES PATENT OFFICE
CERTIFICATE OF CORRECTION

Patent No. 3,523,060          Dated 8/4/70

Inventor(s) Lloyd E. Herdle, Alexander Walker, Jr., and Frank L. Wells, Rochester, N.Y.

It is certified that error appears in the above-identified patent and that said Letters Patent are hereby corrected as shown below:

In column 6, line 24 delete "1355°C" and substitute therefor ---135°C---.

In Table 3, line 11, delete "32.2" and substitute therefor ---32.3---.

In Table 3, line 12, delete "0.5" and substitute therefor ---0.6---. (This is in column 5 of this table).

SIGNED AND SEALED
JAN 19 1971

(SEAL)
Attest:

Edward M. Fletcher, Jr.
Attesting Officer

WILLIAM E. SCHUYLER, JR.
Commissioner of Patents